United States Patent Office 2,938,900
Patented May 31, 1960

2,938,900
METHYL 2,3-ISOPROPYLIDENE-5-KETO-L-RHAMNOFURANOSIDE

Edward Walton, Scotch Plains, N.J., assignor to Merck & Co., Inc., Rahway, N.J., a corporation of New Jersey No Drawing. Filed Dec. 26, 1957, Ser. No. 705,110

27 Claims. (Cl. 260—210)

This invention relates to new sugar-like compounds and processes of obtaining the same. More particularly, it is concerned with a new compound, herein called methyl-α-noviopyranoside, and methods of preparing this compound.

Methyl α-noviopyranoside having the structural formula:

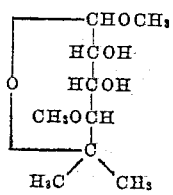

is a valuable new compound which is useful as an intermediate in the synthesis of novobiocin and other novobiocin-like compounds.

It is an object of this invention to provide the new compound methyl α-noviopyranoside and other new compounds useful as intermediates in the production of said methyl-α-noviopyranoside. In addition, it is an object of this invention to provide a method of preparing methyl α-noviopyranoside from methyl 2,3-isopropylidene-L-rhamnofuranoside. Other objects will be apparent from the detailed description hereinafter provided.

In accordance with the present invention, methyl α-noviopyranoside is produced from methyl 2,3-isopropylidene-L-rhamnofuranoside by reactions which can be shown as follows:

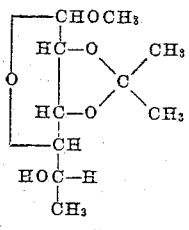

I
Methyl 2,3-isopropylidene-L-rhamnofuranoside

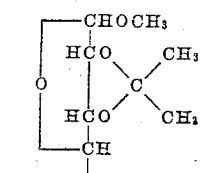

II
Methyl 2,3-isopropylidene-5-keto-L-rhamnofuranoside

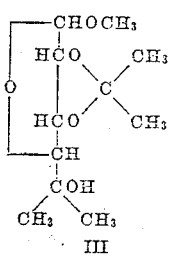

III
Methyl 5,5-dimethyl-2,3-isopropylidene-L-lyxofuranoside

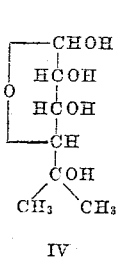

IV
5,5-dimethyl-L-lyxose

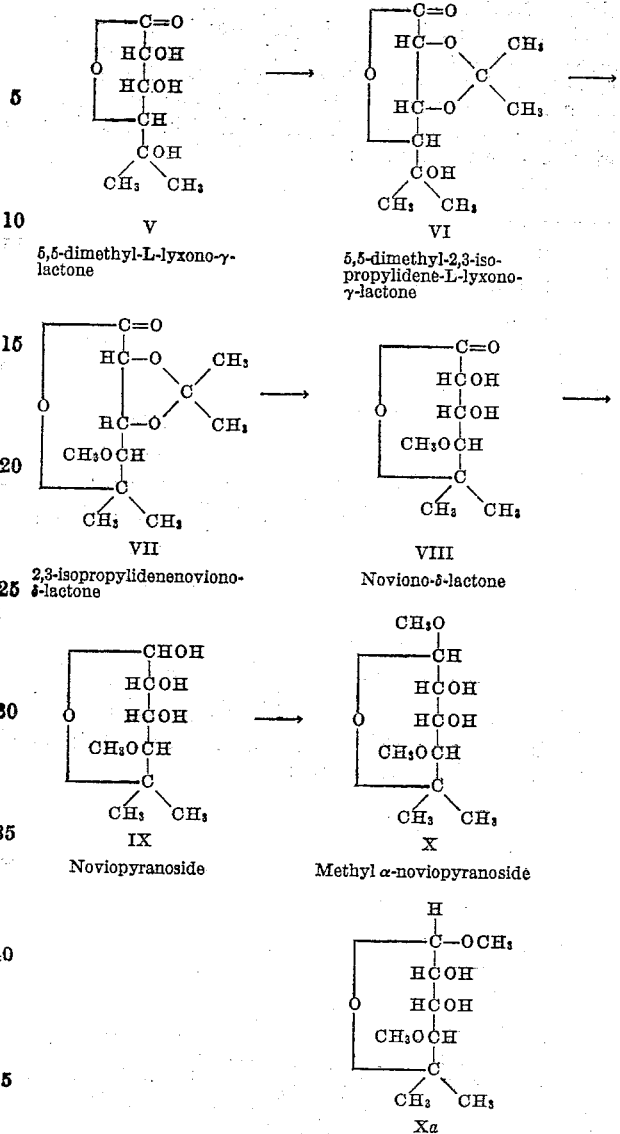

V
5,5-dimethyl-L-lyxono-γ-lactone

VI
5,5-dimethyl-2,3-isopropylidene-L-lyxono-γ-lactone

VII
2,3-isopropylidenenoviono-δ-lactone

VIII
Noviono-δ-lactone

IX
Noviopyranoside

X
Methyl α-noviopyranoside

Xa
Methyl β-noviopyranoside

In the foregoing depicted reactions the starting material is first reacted with an oxidizing agent to produce methyl 2,3-isopropylidene-5-keto-L-rhamnofuranoside, which upon reaction with a methyl magnesium halide, is converted to methyl 5,5-dimethyl-2,3-isopropylidene-L-lyxofuranoside. This latter compound is then hydrolyzed by reaction with a non-oxidizing inorganic acid to obtain 5,5-dimethyl-L-lyxose which is then oxidized to produce 5,5-dimethyl-L-lyxono-γ-lactone. Conversion of 5,5-dimethyl-L-lyxono-γ-lactone to the corresponding 2,3-isopropylidene derivative and methylation of the sodium salt of this intermediate results in the production of 2,3-isopropylidenenoviono-δ-lactone. Upon hydrolyzing 2,3-isopropylidenenoviono-δ-lactone with a non-oxidizing inorganic acid noviono-δ-lactone is obtained. When noviono-δ-lactone is reduced by reaction with suitable reducing agents noviopyranoside is obtained, which upon methylation is converted to a mixture of methyl α-noviopyranoside and methyl β-noviopyranoside. The mixture of methyl α-noviopyranoside and methyl β-noviopyranoside can then be separated by fractional crystallization from suitable solvent mediums to produce methyl α-noviopyranoside and methyl β-noviopyranoside.

The methyl α-noviopyranoside produced by the processes of this invention can be converted to methyl 3-O-carbamyl-α-noviopyranoside in accordance with the processes and reactions shown in co-pending application Serial No. 705,113, filed December 26, 1957.

Thus, when methyl α-noviopyranoside is reacted with phosgene in the presence of pyridine methyl α-noviopyranoside 2,3-carbonate is obtained. Reaction of this compound with ammonia in methanol solution affords methyl 3-O-carbamyl-α-noviopyranoside. These reactions may be shown as follows:

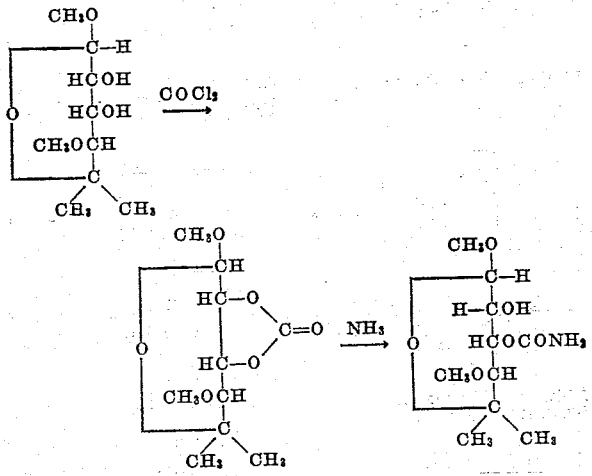

The methyl 3-O-carbamyl-α-noviopyranoside can then be hydrolyzed by reaction with hydrochloric acid in aqueous solution until the rotation of solution remains constant, thereby producing 3-O-carbamylnoviose. This reaction can be shown as follows:

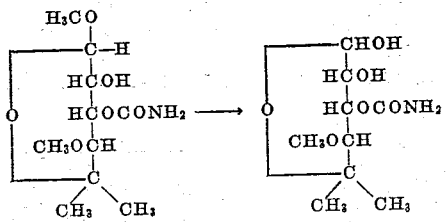

The 3-O-carbamylnoviose which was also referred to as 3-carbamyl-4-methylnovobiose can be used as an intermediate in the total synthesis of novobiocin in accordance with specific procedures described and claimed in co-pending application Serial No. 579,130, filed April 19, 1956, and Serial No. 705,139 filed December 26, 1957. For example, reaction of methyl 3-O-carbamylnoviose with acetic anhydride in the presence of sodium acetate at 100° C. produces the diacetylated derivative and reaction of the latter compound with anhydrous hydrogen chloride at a temperature of 0° C. affords 1-chloro-2-O-acetyl-3-O-carbamylnoviose. Reaction of this product with 3-(3-[γ,γ-dimethylallyl]-4-acetoxybenzamido)-4,7-dihydroxy-8-methylcoumarin in the presence of silver oxide and hydrolysis of the condensation product with sodium hydroxide affords novobiocin. The 3-(3-[γ,γ-dimethylallyl]-4-acetoxybenzamido)-4,7-dihydroxy-8-methylcoumarin is prepared by reacting 2-methyl resorcinol with ethyl cyanoacetate in the presence of zinc chloride and hydrogen chloride at about 0° C. to produce 7-hydroxy-4-imino-8-methyl-2-oxochroman, hydrolyzing this compound with 50% sulfuric acid at about 100° C. to obtain 4,7-dihydroxy-8-methylcoumarin, treating this compound in aqueous solution with sodium nitrite to produce 2,4-dioxo-7-hydroxy-8-methyl-3-oximinochroman, reducing this compound with hydrogen in the presence of palladium on charcoal to obtain 3-amino-4,7-dihydroxy-8-methylcoumarin, and condensing this compound with 3-(γ,γ-dimethylallyl)-4-acetoxybenzoyl chloride in water in the presence of sodium acetate. The 3-(γ,γ-dimethylallyl)-4-acetoxybenzoyl chloride is prepared by reacting ethyl p-hydroxybenzoate with γ,γ-dimethylallyl bromide in toluene in the presence of sodium to obtain ethyl 3-(γ,γ-dimethylallyl)-4-hydroxy benzoate, hydrolyzing this compound with sodium hydroxide to produce the free acid, acetylating this compound by reaction with acetic anhydride in the presence of pyridine to obtain the 4-acetoxy compound, and reacting the sodium salt of 3-(γ,γ-dimethylallyl)-4-acetoxybenzoate with oxalyl chloride.

The following examples illustrate the processes of the present invention:

EXAMPLE I

*Methyl 2,3-isopropylidene-5-keto-L-rhamnofuranoside (II)*

A solution of 10.9 g. (0.05 mole) of methyl 2,3-isopropylidene-L-rhamnofuranoside (I) in 110 ml. of dry pyridine is added to a freshly prepared chromium trioxide-pyridine complex solution containing 11 g. of chromium trioxide in 110 ml. of dry pyridine. The mixture is stirred at room temperature for 20 hours. Most of the pyridine is evaporated under reduced pressure, and the brown residue is dissolved in water and extracted with ether. The ethereal solution is dried over magnesium sulfate and concentrated under reduced pressure to give a yellow oil. Distillation of a small portion of this oil at 70° C. (0.5 mm.) yields a light yellow oil, $[\alpha]_D^{25}$ −50° in methanol (c. 2). Repetition of the above oxidation procedure yielded after distillation 7.9 g. of methyl 2,3-isopropylidene-5-keto-L-rhamnofuranoside, $[\alpha]_D^{25}$ −25° in methanol (c. 2), $n_D^{25}$ 1.4464, $$\lambda_{max.}^{CHCl_3} \; 5.80 \; (C=O)$$

*Analysis.*—Calcd. for $C_{10}H_{16}O_5$: C, 55.54; H, 7.45; $OCH_3$, 14.3. Found: C, 55.57; H, 7.59; $OCH_3$, 13.8.

EXAMPLE II

*Methyl 5,5-dimethyl-2,3-isopropylidene-L-lyxofuranoside (III)*

Methyl magnesium iodide is prepared by dropping a solution of 1.93 ml. of methyl iodide in 15 ml. of dry ether into a stirred mixture of 0.75 g. of magnesium in 15 ml. of ether. A solution of 2 g. of methyl 2,3-isopropylidene-5-keto-L-rhamnofuranoside (II) in 20 ml. of ether is added to the solution of methyl magnesium iodide. After the addition is complete the mixture is refluxed for 40 minutes. The cooled reaction is poured into ice and acidified with 3 N hydrochloric acid. The ether layer is separated and the aqueous layer is extracted with three portions of ether. The ether layers are immediately washed with aqueous sodium bicarbonate and dried. Concentration of the ether solution yields 1.8 g. of an oil. The oil is distilled at 50–70° C./0.5 mm. to yield 1.7 g. of methyl 5,5-dimethyl-2,3-isopropylidene-L-lyxofuranoside, $[\alpha]_D^{34}$ −88° in methanol (c. 2.16), $N_D^{24}$ 1.4467.

*Analysis.*—Calcd. for $C_{11}H_{20}O_5$: C, 56.88; H, 8.67. Found: C, 56.89; H, 8.45.

EXAMPLE III

*5,5-dimethyl-L-lyxose (IV)*

A mixture of 1.1 g. of methyl 5,5-dimethyl-2,3-isopropylidine-L-lyxofuranoside (III) and 20 ml. of 0.1 N hydrochloric acid is warmed on the steam bath for 1 hour. After this period of heating, the rotation becomes constant indicating that the hydrolysis is complete. The product consisting of a mixture of the α and β forms of 5,5-dimethyl-L-lyxose $[\alpha]_D^{25}$ +24.2 in 0.1 N hydrochloric acid (c. 4.14) is recovered by concentrating the reaction solution to dryness.

EXAMPLE IV

5,5-dimethyl-L-lyxono-γ-lactone (V)

A solution of 3.35 g. (14.4 mole) of methyl 5,5-dimethyl-2,3-isopropylidene-L-lyxofuranoside (III) in 33 ml. of 0.1 N hydrochloric acid is refluxed for 1 hour and 3.8 g. of sodium bicarbonate is added to the solution of 5,5-dimethyl-L-lyxose. The mixture is cooled to 0° C., and 0.8 ml. (15 mole) of bromine is slowly added. This mixture is stirred at room temperature for 1 hour after which it is made alkaline to pH 12 by addition of 30% sodium hydroxide solution. After keeping the solution at room temperature for an additional hour, it is acidified to pH 1 with hydrochloric acid, and concentrated to dryness by lyophilization. The solid residue is extracted in a Soxhlet with chloroform overnight. The chloroform solution is concentrated under reducer pressure to yield 2.2 g. of crude 5,5-dimethyl-L-lyxono-γ-lactone as a clear oil, $$\lambda_{max.}^{CHCl_3} \ 5.65$$

(lactone C=O).

EXAMPLE V

5,5-dimethyl-2,3-isopropylidene-L-lyxono-γ-lactone (VI)

A mixture of 2.2 g. (12.5 mole) of 5,5-dimethyl-L-lyxono-γ-lactone (V), 100 ml. of dry acetone, 4.0 g. of anhydrous calcium chloride, and a small amount of hydrogen chloride is stirred at room temperature for 20 hours and filtered. Ten grams of silver carbonate is added to the filtrate. The mixture is stirred at room temperature for 1 hour and filtered through Supercel. The filtrate is concentrated under reduced pressure to a semi-solid residue. This residue is digested with 1 liter of ether and a small amount of insolubles is separated by filtration. Crystallization occurs when the filtrate is concentrated to 90 ml., and 800 mg. of product, M.P. 127-129° C.; $[\alpha]_D^{25}$ —52° in acetone (c. 1.33), $$\lambda_{max.}^{CHCl_3} \ 5.62$$

(lactone C=O) is obtained.

The filtrates are concentrated under reduced pressure and the residue evaporatively distilled at 95° C. (0.05 mm.) giving a mixture of oil and crystals. The oil is removed by washing with ether. The crystalline portion is recrystallized from 18 ml. of ether giving an additional 300 mg. of product, M.P. 127-128° C. Recrystallization yields a purified sample, M.P. 128-129° C.

$$\lambda_{max.}^{CHCl_3} \ 5.62\mu$$

(lactone C=O).

Analysis.—Calcd. for $C_{10}H_{16}O_5$: C, 55.54; H, 7.45. Found: C, 55.74; H, 7.41.

EXAMPLE VI

2,3-isopropylidenenoviono-δ-lactone (VII)

A mixture of 400 mg. of 5,5-dimethyl-2,3-isopropylidene-L-lyxono-γ-lactone (VI) in 10 ml. of water is titrated with 0.1 N sodium hydroxide. The neutral aqueous solution is lyophilized to give a residue of sodium 5,5-dimethyl-2,3-isopropylidene-L-lyxonate. The salt is dissolved in 30 ml. of anhydrous ammonia and the solution is treated with one equivalent of metallic sodium. The reaction mixture is treated with 2 to 4 equivalents of methyl iodide and the ammonia is allowed to evaporate. The residue is hydrolyzed at room temperature for 90 minutes with 0.1 N sodium hydroxide. The solution is then neutralized with 0.1 N hydrochloric acid and lyophilized. The residue is dissolved in ether and washed with sodium bicarbonate solution. The ether solution is dried and concentrated to dryness. The 2,3-isopropylidenenoviono-δ-lactone (VII), M.P. 100-102° C., $$[\alpha]_D^{25} -41°$$

in acetone (c. 1.8), $$\lambda_{max.}^{Nujol} \ 5.75\mu$$

is isolated from its mixture with starting material VI by fractional crystallization from ether-petroleum ether.

EXAMPLE VII

Noviono-δ-lactone (VIII)

A solution of 300 mg. of 2,3-isopropylidene-noviono-δ-lactone (VII) in 20 ml. of 0.1 N hydrochloric acid is warmed on the steam bath until the optical rotation becomes constant. The solution is lyophilized and the residue is recrystallized from ether to give noviono-δ-lactone (VIII), M.P. 105-6° C., $[\alpha]_D^{25}$ —35° in hydrochloric acid (c. 1).

EXAMPLE VIII

Noviopyranoside (IX)

A mixture of 500 mg. of noviono-δ-lactone (VIII) and 20 ml. of water is cooled to 0° C. in an ice-bath. About 0.04 ml. of 10 percent sulfuric acid is added followed by 10 g. of 2.5 percent sodium amalgam in 2.5 g. portions. The mixture is stirred and dilute sulfuric acid is added to maintain the solution acid to Congo-red paper. After about 1 hour the solution is separated from the mercury and treated with enough sodium carbonate so that, after standing 1 hour, the solution is slightly alkaline. The solution is made slightly acidic by adding dilute sulfuric acid. The solution is freed of sodium sulfate by passing it through first a strong cation exchange resin and then a strong anion exchange resin. The aqueous effluent is lyophilized to yield a residue of the α and β forms of noviopyranoside.

EXAMPLE IX

Methyl α and β-noviopyranosides (X and Xa)

A solution of 400 mg. of a mixture of (IX) in 50 ml. of dry methanol containing 0.5 percent anhydrous hydrogen chloride is kept at room temperature until the optical rotation becomes constant. The hydrogen chloride is removed by stirring with silver carbonate. The mixture is filtered and the filtrate is concentrated to yield a mixture which is separated by fractional crystallization from petroleum ether into methyl-α-noviopyranoside, M.P. 69-71° C., $[\alpha]_D^{25}$ —45° in water (c. 1.5), and methyl-β-noviopyranoside, M.P. 66-67.5° C.

$$[\alpha]_D^{27} +106°$$

in water (c. 0.7).

Various changes and modifications may be made in carrying out the present invention without departing from the spirit and scope thereof. Insofar as these changes and modifications are within the purview of the annexed claims, they are to be considered as part of our invention.

What is claimed is:

1. The process which comprises reacting methyl 2,3-isopropylidene-L-rhamnofuranoside with an oxidizing agent to produce methyl 2,3-isopropylidene-5-keto-L-rhamnofuranoside.

2. The process of claim 1 wherein the oxidation is carried out with chromium trioxide-pyridine complex.

3. The process which comprises reacting methyl 2,3-isopropylidene-5-keto-L-rhamnofuranoside with methyl magnesium halide to produce methyl 5,5-dimethyl-2,3-isopropylidene-L-lyxofuranoside.

4. The process of claim 3 wherein the methyl magnesium halide is methyl magnesium iodide.

5. The process which comprises hydrolyzing methyl 5,5-dimethyl-2,3-isopropylidene-L-lyxofuranoside by reaction with an inorganic non-oxidizing acid to produce 5,5-dimethyl-L-lyxose.

6. The process of claim 5 wherein the acid is hydrochloric acid.

7. The process which comprises oxidizing 5,5-dimethyl-L-lyxose to produce 5,5-dimethyl-L-lyxono-γ-lactone.

8. The process of claim 7 wherein the oxidizing agent is bromine.

9. The process which comprises reacting 5,5-dimethyl-L-lyxono-γ-lactone with acetone in the presence of hydrogen chloride under anhydrous conditions to produce 5,5-dimethyl-2,3-isopropylidene-L-lyxono-γ-lactone.

10. The process which comprises methylating the sodium salt of 5,5-dimethyl-2,3-isopropylidene-L-lyxono-γ-lactone by reaction with a methyl halide in the presence of sodium to produce 2,3-isopropylidenenoviono-δ-lactone.

11. The process of claim 10 wherein the methylation is carried out by reaction with methyl iodide in the presence of sodium.

12. The process which comprises hydrolyzing 2,3-isopropylidenenoviono-δ-lactone by reaction with an inorganic non-oxidizing acid to produce noviono-δ-lactone.

13. The process of claim 12 wherein the acid is hydrochloric acid.

14. The process which comprises reacting noviono-δ-lactone with a reducing agent to produce noviopyranoside.

15. The process according to claim 14 wherein the reducing agent is sodium amalgam.

16. The process which comprises reacting noviopyranoside with methanol in the presence of an inorganic non-oxidizing acid to produce a mixture of methyl α-noviopyranoside and methyl β-noviopyranoside.

17. The process which comprises separating a mixture of methyl α-noviopyranoside and methyl β-noviopyranoside by fractional crystallization from a suitable solvent medium.

18. A process according to claim 17 wherein the solvent is petroleum ether.

19. The process which comprises reacting methyl 2,3-isopropylidene-L-rhamnofuranoside with an oxidizing agent to produce methyl 2,3-isopropylidene-5-keto-L-rhamnofuranoside, treating this compound with a methyl magnesium halide to obtain methyl 5,5-dimethyl-2,3-isopropylidene-L-lyxofuranoside, hydrolyzing this compound by reaction with an inorganic non-oxidizing acid to produce 5,5-dimethyl-L-lyxose, reacting this compound with an oxidizing agent to obtain 5,5-dimethyl-L-lyxono-γ-lactone, converting this compound to the corresponding isopropylidene derivative, treating the sodium salt of this compound with a methyl halide in the presence of sodium to produce 2,3-isopropylidenenoviono-δ-lactone, hydrolyzing this compound by reaction with an inorganic non-oxidizing acid to obtain noviono-δ-lactone, reducing this reaction product to obtain noviopyranoside and reacting this compound with methanol in the presence of an inorganic non-oxidizing acid to produce a mixture of methyl α-noviopyranoside and methyl β-noviopyranoside.

20. The process which comprises reacting methyl 2,3-isopropylidene-L-rhamnofuranoside with chromium trioxidepyridine complex to produce methyl 2,3-isopropylidene-5-keto-L-rhamnofuranoside, treating this compound with methyl magnesium iodide to obtain methyl 5,5-dimethyl-2,3-isopropylidene-L-lyxofuranoside, hydrolyzing methyl 5,5-dimethyl-2,3-isopropylidene-L-lyxofuranoside by reaction with hydrochloric acid to produce 5,5-dimethyl-L-lyxose, oxidizing this compound by reaction with bromine to produce 5,5-dimethyl-L-lyxono-γ-lactone, reacting this compound with acetone in the presence of hydrochloric acid under anhydrous conditions to obtain 5,5-dimethyl-2,3-isopropylidene-L-lyxono-γ-lactone, treating the sodium salt of this compound with methyl iodide in the presence of sodium and hydrolyzing the resulting reaction products to produce 2,3-isopropylidenenoviono-δ-lactone, hydrolyzing said product by reaction with hydrochloric acid to produce noviono-δ-lactone, reducing this compound by reaction with sodium amalgam to produce noviopyranoside and hydrolyzing this compound by reaction with hydrochloric acid to produce a mixture of methyl α-noviopyranoside and methyl β-noviopyranoside.

21. Methyl 2,3-isopropylidene-5-keto-L-rhamnofuranoside.

22. Methyl 5,5-dimethyl-2,3-isopropylidene-L-lyxofuranoside.

23. 5,5-dimethyl-L-lyxose.

24. 5,5-dimethyl-L-lyxono-γ-lactone.

25. 5,5-dimethyl-2,3-isopropylidene-L-lyxono-γ-lactone.

26. 2,3-isopropylidenenoviono-δ-lactone.

27. Noviono-δ-lactone.

No references cited.